United States Patent Office 3,708,261
Patented Jan. 2, 1973

3,708,261
COMPOUNDS HAVING METHYLOL GROUPS AND UNSATURATED GROUPS ARE USED WITH SELECTED CATALYSTS TO PRODUCE A DURABLE PRESS PRODUCT
Andrew A. Kasper, Watertown, and Leonard Lifland, Wellesley, Mass., assignors to The Kendall Company, Walpole, Mass.
No Drawing. Filed Mar. 21, 1969, Ser. No. 809,371
Int. Cl. D06m 15/56, 15/36, 13/40
U.S. Cl. 8—116.3
19 Claims

ABSTRACT OF THE DISCLOSURE

A process and the product thereof wherein easy care or permanent press characteristics are imparted to substrates including at least ten percent polymeric cellulosic fibers by the application thereto of one or more suitable unsaturated compounds either alone or together with other aminoplast resins and in the presence of one or more suitable catalysts comprising a metal salt in which the metal ion is aluminum, zinc, zirconyl and titanyl and the anion is of an acid selected from hydrochloric acid, nitric acid, sulphuric acid, phosphoric acids and organic carboxylic and sulfonic acids having a pK up to 6, said metal salt being soluble in water to the extent of at least 0.1 percent by weight, the unsaturated compound, having at least one group capable of interacting with the hydroxy groups of the polymeric cellulosic fibers, curing and interacting in the presence of the said suitable catalyst upon application of suitable thermal energy.

BACKGROUND OF THE INVENTION

The art of imparting easy care or permanent press characteristics to textile substrates of cotton and of blends of cotton and synthetic polymeric fibers has had considerable development in the United States. In the early stages such substrates were treated with aqueous solutions including a textile resin having one type of functional group, an organic acid curing catalyst and preferably a softener. After drying at temperatures insufficient to initiate resin cure, the fabric was then made into a garment which was pressed to remove wrinkles and provide desired creases. Thereafter the garment was subjected to a temperature sufficiently high to initiate and completely cure the resin.

Subsequent developments included the use of resins having two different functional groups conjunctive with the use of more than one catalyst, one functional group being activated prior to manufacture of the garment and the other being activated after the garment was manufactured and pressed.

A further development involved the use of textile resins with two different functional groups including groups capable of polymerization. The impregnated fabric was dried at temperatures below the activation temperature of the catalyst and then was subjected to irradiation to form the polymer and form carbon to carbon links with the cellulose. Thereafter the garment was prepared and pressed and subjected to sufficiently high temperatures to react the remaining functional groups of the polymer with the cellulose.

A second technique, that of Rutherford and Walsh, involves grafting the monomeric N-methylol compound to the cellulose by mild acidic catalyst systems. The fabric is then washed and dried. The resulting fabric is irradiated to impart durable press characteristics to the fabric.

A recent patent, No. 3,423,163 issued Jan. 21, 1969, assigned to E. I. du Pont de Nemours and Co., is also concerned with irradiation techniques.

The major disadvantage of irradiation processes is the high capital investment for proper irradiation equipment.

Other techniques involving the use of free radical initiators instead of irradiation techniques to bring about polymerization and grafting of the monomers to the cellulose have not been entirely satisfactory in that serious loss of tensile strength and tear strength from that of the original fabric have resulted. Other problems are difficulties in controlling the rate and degree of polymerization of the monomer.

G. Sumrell, M. F. Margavio and C. M. Welch published an article in the January 1969 Textile Research Journal, pp. 78–85, entitled "The Acrylation, Methacrylation, and Acrylamidomethylation of Cellulose," which was abstracted as follows:

"Partially acrylated and methacrylated cottons have been prepared from the respective acid chlorides and cotton fabric in the presence of various bases. Some of the physical properties of these materials were determined, and the acrylates were cross-linked through the double bond by two methods to give materials with wrinkle recoveries in the wash-wear range. One of the methods utilized sodium hydrogen sulfide as the cross-linking agent, and the other involved an over-cure with zinc nitrate as an acid catalyst. The latter method was also used to bring about a cross-linking reaction between cotton and N-methylolacrylamide by a one-step cure to give cottons with high wrinkle recoveries. The acid-catalyzed addition of acrylamide to cotton also was demonstrated. This process involved free radical as well as ionic mechanisms."

SUMMARY OF THE INVENTION

It is an object of this invention to provide a process whereby substrates, for example woven textile fabrics including at least ten percent cellulose fibers may be treated without the use of expensive irradiation equipment and without the use of free radical initiators, such as potassium persulphate, to impart easy care and durable press characteristics thereto.

It is a further object of this invention to provide a process for imparting to a substrate, for example woven textile fabrics including at least ten percent cellulose fibers, satisfactory vertical strip crease recovery wet and dry angles as described in ASTM Test No. D1295–53T without the great loss of tensile strength and tear strength normally associated with the use of free radical initiators.

It is a further object of this invention to provide a process applicable to both single step and two step impartation of easy care and durable press characteristics to a substrate, for example woven textile fabric including at least ten percent cellulose fibers by the application of thermal energy alone, including in the one step process application of moderate thermal energy for as little as 90 seconds to dry and cure the substrate.

Although we do not wish to be bound by the explanations, we believe that the process of this invention involves in addition to the reaction of the N-methylol group with the cellulose, the polymerization of the monomer which in accordance with the invention is activated by certain types of metal salts. We have some evidence in support of this hypothesis.

High crease recovery characteristic of textile substrates containing from ten percent to a hundred percent cellulose fibers which are treated by the process of the invention cannot be obtained by treating such substrates with one or more of the suitable unsaturated compounds essential to the process in conjunction with a strong acid or an amine salt catalyst. In addition, strong acids and amine salts cause considerable degradation of the cellulose particularly when the process is carried out at moderate to high temperatures. In accordance with the invention, therefore, it is essential that such a substrate be treated not only with one or more suitable unsaturated compounds but also with one or more suitable essential catalysts under proper conditions.

Suitable essential catalysts for the process of this invention are the metal salt catalysts in which the metal ion is selected from the class consisting of aluminum, zinc, zirconyl and titanyl and the anion is of an acid selected from hydrochloric acid, nitric acid, sulphuric acid, phosphoric acids and organic carboxylic and sulfonic acids having a pK up to about 6, the metal salt being soluble in water to the extent of at least 0.1 percent by weight at room temperature.

Representative of typical carboxylic acids whose anions form suitable metal salt catalysts with aluminum, zinc, zirconyl and titanyl ions are those having a molecular weight more than 60, including propionic, chloroacetic, dichloroacetic, trichloracetic, bromoacetic, cyanopropionic, chloropropionic, citric, tartaric, ascorbic, succinic, malic, maleic, oxalic, glutaric, glycolic, lactic, furoic, lutidinic (2,4-pyridinedicarboxylic) and phthalic acids.

Representative of typical sulfonic acids whose anions form suitable metal salt catalysts with aluminum, zinc, zirconyl and titanyl ions are 3-hydroxy propane, sulfonic, 2-chloroethane sulfonic, toluene sulfonic and sulfosuccinic acids.

Salts of other carboxylic and sulfonic acids have the proper solubility in water and the acids fall within the specified pK range, hence are suitable. But some of them are less desirable because of odor, color, cost or for other reasons. It must be understood that salts of the above acids are not all equivalent; some may be destructive at high temperatures and therefore must be used at such temperatures as will minimize degradation of the substrate. In most cases this will necessitate a longer curing time.

The time and temperature of curing is different with different catalyst depending upon the concentration, the acidity of the system and the activity of the metallic ion. If both the acidity and activity of the metallic ion are low, the treated fabric must be cured at higher temperature or for longer time or both. The result will be a substrate with lower mechanical properties for the same angle of crease recovery than where the acidity of the system is relatively high and the activity of the metallic ion is also high. The best balance between crease recovery angle and mechanical properties is obtained using $Al(H_2PO_4)_3$ in amount by weight of 30 percent of the resin. The use of this catalyst makes it possible after drying to accomplish cure within a very short time (40–50 seconds) at 140° C.

Because of the extreme tendency of aluminum ion to hydrolize, simple stoichiometric salts of this metal are generally available from normal chemical sources only as the nitrate, chloride and sulfate. Suitable aluminum salts containing other anions in aqueous solution may in some cases be purchased. Alkophos C, essentially aluminum tri-dihydrogen-phosphate is obtainable from Monsanto Company, Inorganic Chemicals Division, 800 N. Lindbergh Blvd., St. Louis, Mo. 63133. Aluminum and other metal salts of the organic acids were laboratory prepared, as were the original dihydrogen-phosphates of zinc and aluminum, as follows:

The requisite amount of aluminum nitrate was taken (usually 0.3 mole), dissolved in a minimum amount of water, aluminum hydroxide was then precipitated by the addition of excess ammonium hydroxide solution (~1.0 mole). The precipitate stirred with water on a Waring Blendor and filtered through a Buchner funnel to remove the major portion of ammonium nitrate. The filter cake was again stirred (Waring Blendor) with water, refiltered and this washing procedure repeated a second time.

Finally, the rewashed filter cake (¼ aluminum hydroxide and ¾ water) was dissolved in the acid of choice. When the acid was miscible with water, the requisite amount (0.3 mole × basicity) was added directly to the stirring mass in the blender. When the acid was a solid it was first made up as a saturated solution and then the hydroxide was dropped into the stirring liquid.

After adequate mixing and reaction the solution was filtered, its percentage of active catalyst estimated from the weights involved, and the catalyst solution was applied to the cloth in a standard procedure.

In the following table the importance of the catalyst is indicated. The samples were all of the same white cotton poplin fabric (2.53 yards per pound), were treated with the same unsaturated compound in the same concentration, and had the same wet pick-up, so that the weight of resin on the dry fabric is about 10 percent and the weight of the catalyst varies directly with its molecular weight, being 30 percent of the resin weight for $Al(H_2PO_4)_3$ with proportionate equivalent weights for the other catalysts.

TABLE I

| Number of sample | Kind of catalyst | Time and temp. during drying and curing | W plus F angle | Tensile (lbs.) W | Tensile (lbs.) F | Tear (lbs.) F |
|---|---|---|---|---|---|---|
| 1 | $Al(H_2PO_4)_3$ | 90 sec., 140° C. | 310 | 58 | 35 | 1.4 |
| 2 | $Al(NO_5)_3$ | 240 sec., 95° C. | 302 | 49 | 26.3 | 1.1 |
| 3 | $ZnCl_2$ | 600 sec., 150° C. | 291 | 47 | 24 | 0.60 |
| 4 | $Al(Cl_3C—COO)_3$ | 90 sec., 140° C. | 320 | 47 | 27 | 1.25 |
| 5 | $Al(Cl_2CH—COO)_3$ | 90 sec., 140° C. | 325 | 45 | 26 | 0.90 |
| 6 | $Al(ClCH_2—COO)_3$ | 90 sec., 140° C. | 310 | 45 | 29 | 0.80 |
| 7 | $ZrOCl_2$ | 90 sec., 140° C. | 295 | | | 0.50 |
| 8 | $Al(C_2H_5—COO)_3$ | 90 sec., 140° C. | 300 | 51 | 28 | 1.30 |
| 9 | $Al[HO(CH_2)_3SO_3]_3$ | 90 sec., 140° C. | 320 | 31 | 14 | 0.50 |
| 10 | $Al[HOOC(CHOH)_2COO]_3$ | 90 sec., 140° C. | 310 | 41 | 25 | 0.90 |
| 11 | $Al(HOCH_2COO)_3$ | 90 sec., 140° C. | 285 | 51 | 31 | 1.30 |
| Control | | | 110 | 68 | 58 | 1.5 |

Where W represents warp direction and F indicates filling direction.

Easy care or permanent press characteristics are imparted to substrates including at least ten percent polymeric cellulose fibers by treating the fibers in the presence of a suitable catalyst and with the subsequent application of moderate thermal energy with an unsaturated compound containing one or more polymerizable acrylamide or methacrylamide groups of the general structure:

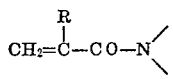

where R is hydrogen or a methyl group and also containing one or more groups reactive with cellulose selected from the class of N-methylol and N-methylol ethers of the general structure:

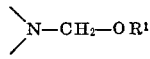

where $R^1$ is preferably hydrogen but may be an alkyl group containing less than five carbon atoms. The said unsaturated compound may be formed prior to the treatment or alternatively in situ during the treatment from the components of which it is the reaction product. Furthermore, the unsaturated compound may be mixed with other similar compounds prior to or during the treatment or one or a mixture of such compounds may be mixed with well known aminoplast resins and chemicals used in imparting crease resistance and durable press characteristics to cellulose-fiber containing fabrics.

Suitable acrylamide and methyacrylamide containing compounds which may be used alone or mixed with each other or with aminoplast resins include the following:

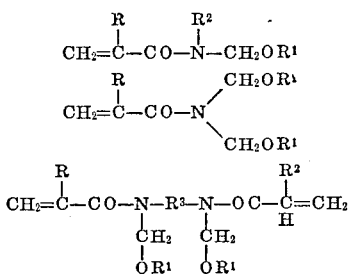

where R is hydrogen (preferred) or a methyl group, $R^1$ is hydrogen (preferred) or an alkyl group (methyl next preferred) of less than five carbon atoms, $R^2$ is hydrogen (preferred) or an alkyl group of less than five carbon atoms, and $R^3$ is an alkylene group having less than 13 carbon atoms with methylene preferred.

The preferred unsaturated compounds useful in the practice of the invention are obtained by the interaction of N-methylolacrylamide or the foregoing similar compounds with aminoplast resins or mixtures thereof.

Suitable unsaturated compounds (reactants) in which one or more

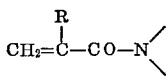

groups are chemically attached to aminoplast resins well known in the art of cellulose crosslinking include the following:

Urea reactants such as:

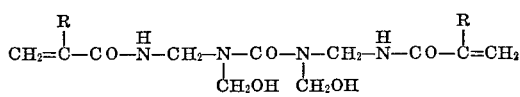

Alkylene urea reactants such as:

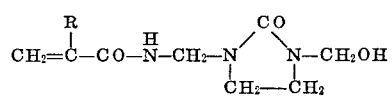

Uron reactants such as:

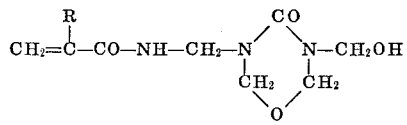

Dihydroxy urea reactants such as:

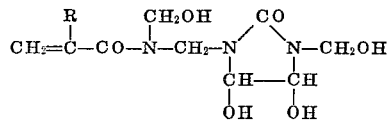

Carbamate reactants such as:

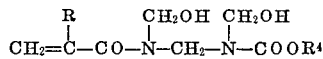

where $R^4$ is a radical from the group methyl, ethyl, hydroxyethyl, methoxyethyl.

Triazone reactants such as:

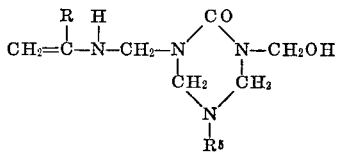

where $R^5$ is a radical selected from the group methyl, ethyl, hydroxylethyl, methoxyethyl; and

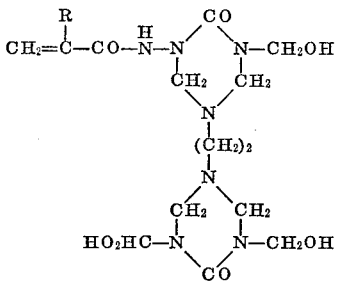

Glyoxal reactants such as:

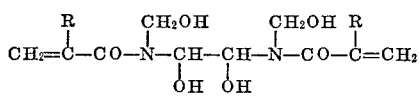

Melamine reactants such as:

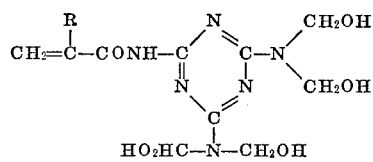

Other typical derivatives which are suitable are those obtained from glyoxal diurein:

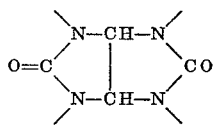

where acrylamido and methylol groups in various ratios are attached to the nitrogens.

TABLE II

| Percent NMA | Percent DMDHEU | Percent catalyst | Wet pick-up | W plus F angle | Tensile, W, F lbs. | W tear (lbs.) | Tensile, F, F (lbs.) | F tear (lbs.) | Time and temperature data |
|---|---|---|---|---|---|---|---|---|---|
| 9 | 7 | 5 Al(H$_2$PO$_4$)$_3$ | 60 | 270 | 60.0 | 1.4 | 38.0 | 1.7 | 90 sec., 130° C. |
| 9 | 7 | 5 Al(H$_2$PO$_4$)$_3$ | 60 | 280 | 61.0 | 1.3 | 37.0 | 1.5 | 90 sec., 135° C. |
| 9 | 7 | 5 Al(H$_2$PO$_4$)$_3$ | 60 | 310 | 58.0 | 1.3 | 35.0 | 1.4 | 90 sec., 140° C. |
| 6 | 10 | 5 Al(H$_2$PO$_4$)$_3$ | 60 | 290 | 62.0 | 1.5 | 34.0 | 1.5 | 90 sec., 125° C. |
| 6 | 10 | 5 Al(H$_2$PO$_4$)$_3$ | 60 | 290 | 58.0 | 1.3 | 34.0 | 1.6 | 90 sec., 130° C. |
| 6 | 10 | 5 Al(H$_2$PO$_4$)$_3$ | 60 | 300 | 57.0 | 1.20 | 32.0 | 1.5 | 90 sec., 135° C. |
| 9 | 7 | 5 Al(NO$_3$)$_3$ | 60 | 302 | 49.6 | 1.0 | 26.3 | 1.4 | 240 sec., 95° C. |
| 9 | 7 | 5 Al(NO$_3$)$_3$ | 60 | 310 | 44.0 | 0.85 | 21.5 | 1.2 | 240 sec., 105° C. |
| 9 | 7 | 5 Al(NO$_3$)$_3$ | 60 | 272 | 51.2 | 1.20 | 28.5 | 1.7 | 240 sec., 85° C. |
| 5.2 | 4.8 | 5 ZnCl$_2$ | 100 | 270 | 51.4 | 0.8 | 31.0 | 0.75 | 300 sec., 150° C. |
| 5.2 | 4.8 | 5 ZnCl$_2$ | 100 | 287 | 48.3 | 0.65 | 33.0 | 0.65 | 420 sec., 150° C. |
| 5.2 | 4.8 | 5 ZnCl$_2$ | 100 | 291 | 47.5 | 0.55 | 24.0 | 0.60 | 600 sec., 150° C. |
| Control | | | | 110 | 68 | 1.5 | 58 | 1.5 | |

TABLE III

| Example | Percent of NMA | Percent of DMDHEU | Percent of DMPU | Percent of Al(NO$_3$)$_3$ | W plus F angle | (W) tensile (lbs.) | (W) tear (lbs.) | W elong. percent | Percent of add-on |
|---|---|---|---|---|---|---|---|---|---|
| 1 | 10.0 | | | 2.0 | 266 | 56.8 | 1.8 | 9.1 | 7.28 |
| 2 | 7.5 | 2.5 | | 2.0 | 290 | 50.0 | 1.4 | 8.4 | 7.56 |
| 3 | 5.0 | 5.0 | | 2.0 | 304 | 45.9 | 1.4 | 8.1 | 8.15 |
| 4 | 2.5 | 7.5 | | 2.0 | 322 | 44.9 | 1.15 | 8.2 | 8.72 |
| 5 | | 10.0 | | 2.0 | 326 | 43.6 | 1.0 | 8.15 | 9.34 |
| 6 | 7.5 | | 2.5 | 2.0 | 272 | 56.0 | 2.0 | 10.0 | 6.70 |
| 7 | 5.0 | | 5.0 | 2.0 | 286 | 55.0 | 1.75 | 10.4 | 6.70 |
| 8 | 2.5 | | 7.5 | 2.0 | 288 | 54.4 | 1.65 | 10.0 | 6.70 |
| 9 | | | 10.0 | 2.0 | 296 | 50.0 | 1.45 | 9.0 | 6.70 |
| Control | | | | | 100 | 68 | 1.7 | 13.5 | |

The results shown in Table II were obtained using N-methylol acrylamide (NMA) reacted with dimethylol dihydroxyethylene urea (DMDHEU) in various ratios. This reaction product is the preferred unsaturated compound in a mol ratio ranging from 2 to 1 to 1 to 1 (NMA to DMDHEU). The latter aminoplast resin is obtainable under the trademark "Permafresh 183" from Sun Chemical Company, P.O. Box 470, Chester, S.C. The preferred molar relationship (2–1) is shown in the first three examples, only the temperature being different. All of the examples in Table II were treated as part of the 100 ml. treating solution with 4 ml. of 35 percent polyethylene emulsion. A high density polyolefin emulsion is obtainable from Onyx Chemical Company, Division Millmaster Onyx Corporation, 190 Warren St., Jersey City, N.J. 07307, under the trademark "Polysan ABR."

Table III gives a comparison of N-methylol acrylamide (NMA), dimethylol dihydroxyethylene urea (DMDHEU) and dimethylol propylene urea (DMPU) each used as the sole aminoplast resin and combinations of NMA with DEDHEU and with DMPU when the percentage of catalyst [Al(NO$_3$)$_3$] is two percent. This table also shows the percentage of add-on.

The process of this invention may be a one-step process in which the suitable unsaturated compound either alone, in physical mixture or in chemical interaction with other similar unsaturated compounds or with aminoplast resins is used in aqueous solution with a suitable catalyst to treat a suitable substrate preferably by immersion if practical, excess solution being removed as by squeezing until the weight of the wetted substrate is preferably no more than about double that of the untreated dry substrate, so that the total amount of the unsaturated compounds and aminoplast resins in the wet substrate is in the preferred range of about ten percent of the untreated cellulose fiber weight. The substrate is then mounted on a tenter frame and dried and heated to effect cure at ambient temperatures and above, with a preferred range from room temperature to 350° F. and a most preferred range from 200° F. to 300° F.

Alternatively, the process of this invention may be performed in two steps, the substrate being treated in the same way down to the point of drying. At that point the substrate may be dried under such conditions that substantially no curing occurs. Thereafter the substrate may be made into garments, after which the unsaturated compound may be cured to crosslink the cellulose fibers during the pressing operation or in a separate step.

The methods of this invention have the advantage that curing of the unsaturated compound and interaction with the cellulose is done by the application of thermal energy alone and in the preferred embodiments may be accomplished from the wet impregnated substrate stage to the dried and fully cured stage in as little as 90 seconds at 285° F. This means that easy care and durable press characteristics utilizing suitable unsaturated compounds of the present invention may be achieved in a one-step process on the finishing range, and preparation of suitable substrates to the precure stage may also be carried out on the finishing range without additional equipment. Fabrics treated to the precured stage may afterwards be fully cured in a second step during the pressing operation or in a separate operation.

While it is possible to apply unsaturated compounds to a suitable substrate in accordance with the invention in amounts which cause the fabric to become boardy, or on the other hand in amounts insufficient to impart satisfactory durable press characteristics, for best results the ratio between the weight of the untreated cellulose fibers in the dry fabric, the weight of the cured compound and the weight of the catalyst are about as follows: 100:7–12:2–6 with a preferred ratio: 100: about 10:3–5. Thus in the examples in Table I in which the substrate was cotton poplin, the resin on the fabric was about ten percent and the catalyst three percent. As the cotton fiber content in blends is reduced, the proportion remains substantially the same. Thus with a 90/10 polyester cotton blend substrate, the cured compound weight would be about ten percent of the cotton fiber weight or one percent of the total untreated fiber weight. In the same fabric, the catalyst would be three percent of the cotton fiber weight and .3 percent of the total untreated fiber weight.

The minimum amount of unsaturated compound for use in the present invention is about four percent by weight of the cellulose fiber when not mixed with an aminoplast resin. In the case of mixtures, the minimum quantity is about five percent by weight of the mixture, and the minimum weight of the mixture is about four percent of the cellulose fibers.

In treating 100 percent cotton, typical treating fluids are made up as follows:

(a)

16.6 ml. of 60 percent unsaturated compound solution (NMA)

4 ml. of 35 percent polyethylene emulsion 1.5 grams of Zn(NO$_3$)$_2$·6H$_2$O

The above is made up to 100 ml. with added water and the wet pick-up is 100 percent of the dry substrate weight.

(b)

16.6 ml. of 60 percent unsaturated compound solution (NMA)
4 ml. of 35 percent polyethylene emulsion
2 grams of Al(NO$_3$)$_2$·9H$_2$O The above is made up to 100 ml. with added water and the wet pick-up is 100 percent of the dry substrate weight.

(c)

15 ml. of 60 percent unsaturated compound solution (NMA)
14 ml. of 50 percent Permafresh 183 solution (DMDHEU)
10 ml. of 50 percent Alkophos C solution [Al(H$_2$PO$_4$)$_3$]
4 ml. of 35 percent polyethylene emulsion The above is made up to 100 ml. with added water and the wet pick-up is 60 percent of the dry substrate weight.

As a practical matter when the substrate is 50/50 polyester/cotton, the treating fluids for all cotton substrates are diluted by adding an equal amount of water. Likewise, when the substrate is 90/10 polyester/cotton, the all-cotton treating fluid is diluted by adding an amount of water nine times the volume of the original treating fluid and when the substrate is 65/35 polyester/cotton, the all-cotton treating fluid is diluted by adding an amount of water which is 65/35 times the volume of the original treating fluid.

Using the treating fluid of Example (c) above and diluting it with an equal amount of water, a treating fluid for a 50/50 polyester/cotton blend fabric was prepared. Similarly, a treating fluid for a 65/35 polyester/cotton fluid was prepared by diluting the fluid of Example (c) with 65 ml. of water to every 35 ml. of fluid in Example (c). The two fabrics were treated with their respective fluids, the wet pick-up being 60 percent of the dry untreated substrate weight. As is indicated in Table IV, not only were excellent W+F angles imparted but the treated fabric in both instances was equal or superior in tensile and tear strengths to the untreated controls.

TABLE IV

| Kind of fabric | W plus F angle | W tensile (lbs.) | W tear (lbs.) | F tensile (lbs.) | F tear (lbs.) |
|---|---|---|---|---|---|
| Polyester-cotton 50/50 | 301 | 81 | 5.6 | 85 | 5.5 |
| Untreated control | 245 | 77 | 4 | 75 | 3.4 |
| Polyester-cotton 65/35 | 315 | 100 | 4.5 | 54 | 5.8 |
| Untreated control | 260 | 100 | 4 | 50 | 5 |

DESCRIPTION OF THE PREFERRED EMBODIMENTS

The preferred one-step process of the invention is that set forth in the third example from the top of Table II wherein NMA and DMDHEU together with Alkophos C are utilized to make treating fluid (c), the wet pick-up being 60 percent of the dry untreated cotton fabric, the drying and curing time being 140° C. for 90 seconds.

The preferred processes for blends is the same except that the treating fluid is diluted with water as set forth in the specification.

The preferred two-step process for 100 percent cotton and for polyester cotton blends is the same as the one-step method except the drying temperature can be varied. Curing is done when the fabric is pressed or otherwise treated at 140° C. for 40 to 50 seconds.

We claim:

1. A substantially dry textile fabric substrate including at least ten percent cellulose fibers containing a composition comprising N-methylol acrylamide or N-methylol methacrylamide, said composition further including a metal salt catalyst in which the metal ion is selected from the class consisting of aluminum, zinc, zirconyl and titanyl and the anion is of an acid selected from the class consisting of phosphoric acids, organic sulfonic acids and organic carboxylic acids having a molecular weight more than 60, having a pK up to about 6, said metal salt being soluble in water to the extent of at least 0.1 percent by weight at room temperature, said compound being substantially unreacted with said cellulose fibers but adapted to cure and interact with said cellulose upon application of thermal energy.

2. The substrate of claim 1 wherein the metal ion is aluminum.

3. The substrate of claim 1 wherein the catalyst is an acidic aluminum phosphate.

4. The substrate of claim 1 wherein the metal ion is selected from the group consisting of zirconyl and titanyl.

5. The substrate of claim 1 wherein the metal ion is zinc.

6. The substrate of claim 1 wherein the compound is selected from the group consisting of N-methylol acrylamide, and mixtures thereof with dimethylol-dihydroxyethylene urea or dimethylol propylene urea.

7. The substrate of claim 1 wherein the substrate includes at least ten percent cotton fibers, the remainder of the substrate, excluding the composition, being polyester fibers.

8. The substrate of claim 1 wherein the substrate includes at least thirty-five percent cotton fibers, the remainder of the substrate, excluding the composition, being polyester fibers.

9. The substrate of claim 1 wherein the compound is a mixture of N-methylol acrylamide and dimethylol-dihydroxy ethylene urea in a mol ratio ranging from 2 to 1 to 1 to 1.

10. The substrate of claim 9 wherein the catalyst is an acid aluminum phosphate.

11. A process for imparting easy care and durable press characteristics to a textile fabric substrate including at least ten percent cellulose fibers comprising applying to the substrate a composition in aqueous media including N-methylol acrylamide or N-methylol methacrylamide, said composition further including a metal salt catalyst in which the metal ion is selected from the class consisting of aluminum, zinc, zirconyl and titanyl and the anion is an anion of an acid selected from the class consisting of phosphoric acids and organic sulfonic acid and organic carboxylic acids having a molecular weight more than 60, having a pK up to 6, said mteal salt being soluble in water to the extent of at least 0.1 percent by weight at room temperature, drying said substrate and thereafter curing and interacting said compound with the cellulose by the application of thermal energy thereto.

12. The process of claim 11 wherein the metal ion is aluminum.

13. The process of claim 11 wherein the catalyst is an acid aluminum phosphate.

14. The process of claim 11 wherein the metal ion is selected from the group consisting of zirconyl and titanyl.

15. The process of claim 11 wherein the metal ion is zinc.

16. The process of claim 11 wherein the compound is selected from the group consisting of N-methylol acrylamide, and mixtures thereof with, dimethylol-dihydroxyethylene urea or dimethylol propylene urea.

17. The process of claim 11 wherein the substrate before application of the composition includes at least thirty-five percent cotton fibers, the remainder of the substrate being polyester fibers.

18. The process of claim 11 wherein the compound is a mixture of N-methylol acrylamide and dimethylol-dihydroxy ethylene urea in a mol ratio ranging from 2 to 1 to 1 to 1.

19. The process of claim 18 wherein the catalyst is an acid aluminum phosphate.

References Cited

UNITED STATES PATENTS

| | | | |
|---|---|---|---|
| 3,561,916 | 1/1971 | Bartinger | 8—116.3 |
| 3,558,263 | 1/1971 | Bartinger | 8—116.3 |
| 3,125,405 | 3/1964 | Gordon | 8—116.3 |
| 3,572,988 | 3/1971 | Sumrell et al. | 8—120 |
| 3,304,312 | 2/1967 | Beachem | 8—116.3 X |
| 3,363,973 | 1/1968 | Talet | 8—116.3 |
| 3,515,505 | 6/1970 | Kraessig et al. | 8—116.3 |

FOREIGN PATENTS

| | | | |
|---|---|---|---|
| 1,542,850 | 9/1968 | France | 8—116.3 |

OTHER REFERENCES

Sumrell et al., Textile Research Journal, 39, 78–85 (1969).

Hickner et al., Journal of Organic Chemistry, 32, 729–733 (1967).

GEORGE F. LESME, Primary Examiner

J. CANNON, Assistant Examiner

U.S. Cl. X.R.

8—115.7, 120, DIG. 4, DIG. 8; 38—144; 117—139.4